(12) United States Patent
V V Ganeshan et al.

(10) Patent No.: US 10,936,363 B2
(45) Date of Patent: Mar. 2, 2021

(54) AUTOMATIC DATA TRANSFORMATIONS FOR PROCESS AUTOMATIONS

(71) Applicant: ACCENTURE GLOBAL SOLUTIONS LIMITED, Dublin (IE)

(72) Inventors: Kavita V V Ganeshan, Mumbai (IN); Soujanya Soni, Bangalore (IN); Aishwarya Kaliki, Bangalore (IN); Madhura Shivaram, Bangalore (IN); Libin Varughese, Bangalore (IN); Namratha Suresh, Mysore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 81 days.

(21) Appl. No.: 16/267,014

(22) Filed: Feb. 4, 2019

(65) Prior Publication Data
US 2020/0159571 A1    May 21, 2020

(30) Foreign Application Priority Data

Nov. 21, 2018  (IN) .............................. 201811043841

(51) Int. Cl.
*G06F 9/48*      (2006.01)
*G06F 16/178*    (2019.01)
*G06N 20/00*     (2019.01)
*G06F 8/38*      (2018.01)

(52) U.S. Cl.
CPC .............. *G06F 9/4881* (2013.01); *G06F 8/38* (2013.01); *G06F 16/1794* (2019.01); *G06N 20/00* (2019.01)

(58) Field of Classification Search
None
See application file for complete search history.

(56) References Cited

U.S. PATENT DOCUMENTS

| | | | | |
|---|---|---|---|---|
| 2009/0070353 | A1* | 3/2009 | Chorley | G06Q 10/06 706/54 |
| 2010/0191748 | A1* | 7/2010 | Martin | G06F 16/355 707/750 |
| 2011/0280104 | A1* | 11/2011 | McClung, III | E21B 3/02 367/82 |
| 2013/0047150 | A1* | 2/2013 | Malasky | G06F 9/44547 717/176 |

(Continued)

*Primary Examiner* — Tuan C Dao
*Assistant Examiner* — William C Wood
(74) *Attorney, Agent, or Firm* — Mannava & Kang, P.C.

(57) ABSTRACT

An Artificial Intelligence (AI) based data transformation system receives a process document and automatically generates processor-executable code which enables automatic execution of a process as detailed within the process document. Various structural elements of the process documents are identified and the data from the document is clustered based on common parameters which can include the structural elements or textual data from the process document. The contextual information including conditional and non-conditional statements along with the entities and entity attributes are also obtained. The domain knowledge is superimposed on the contextual information to generate flows that represent procedures which make up the process to be automated. Platform specific code for the automatic execution of the process is automatically generated from the flows.

20 Claims, 15 Drawing Sheets

(56) References Cited

U.S. PATENT DOCUMENTS

2015/0363171 A1* 12/2015 Esfahany .............. G06F 40/205
                                                        717/106
2017/0315714 A1* 11/2017 Shyamsundar ..... G06F 16/9038
2019/0213245 A1*  7/2019 Oxstrand ................ G06F 16/22

* cited by examiner

US 10,936,363 B2

AUTOMATIC DATA TRANSFORMATIONS FOR PROCESS AUTOMATIONS

PRIORITY

The present application claims priority under 35 U.S.C. 119(a)-(d) to the Indian Non-Provisional Patent Application Serial No. 201811043841, having a filing date of Nov. 21, 2018, the disclosure of which is hereby incorporated by reference in its entirety.

BACKGROUND

The rapid developments in computer technologies and artificial intelligence (AI) has led to the evolution of automated systems for knowledge work. The automated systems include computer programs that can be configured to process transactions, manipulate data, automatically trigger responses or communicate with other computer systems. These automated systems used for transactions or other automated processes are similar to the robots that are employed in the industrial concerns in terms of increasing productivity and enhancing precision. Domains such as IT support processes, workflow processes, remote infrastructure management such as cloud systems and back-office work can benefit from employing automated systems. A large part of the knowledge is these domains is conveyed via voluminous manuals that detail many processes and procedures. The processes when executed may require data to be gathered from many data sources. Gathering the knowledge pertaining to the processes and procedures can form a significant part of the Artificial Intelligence projects for process automations.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
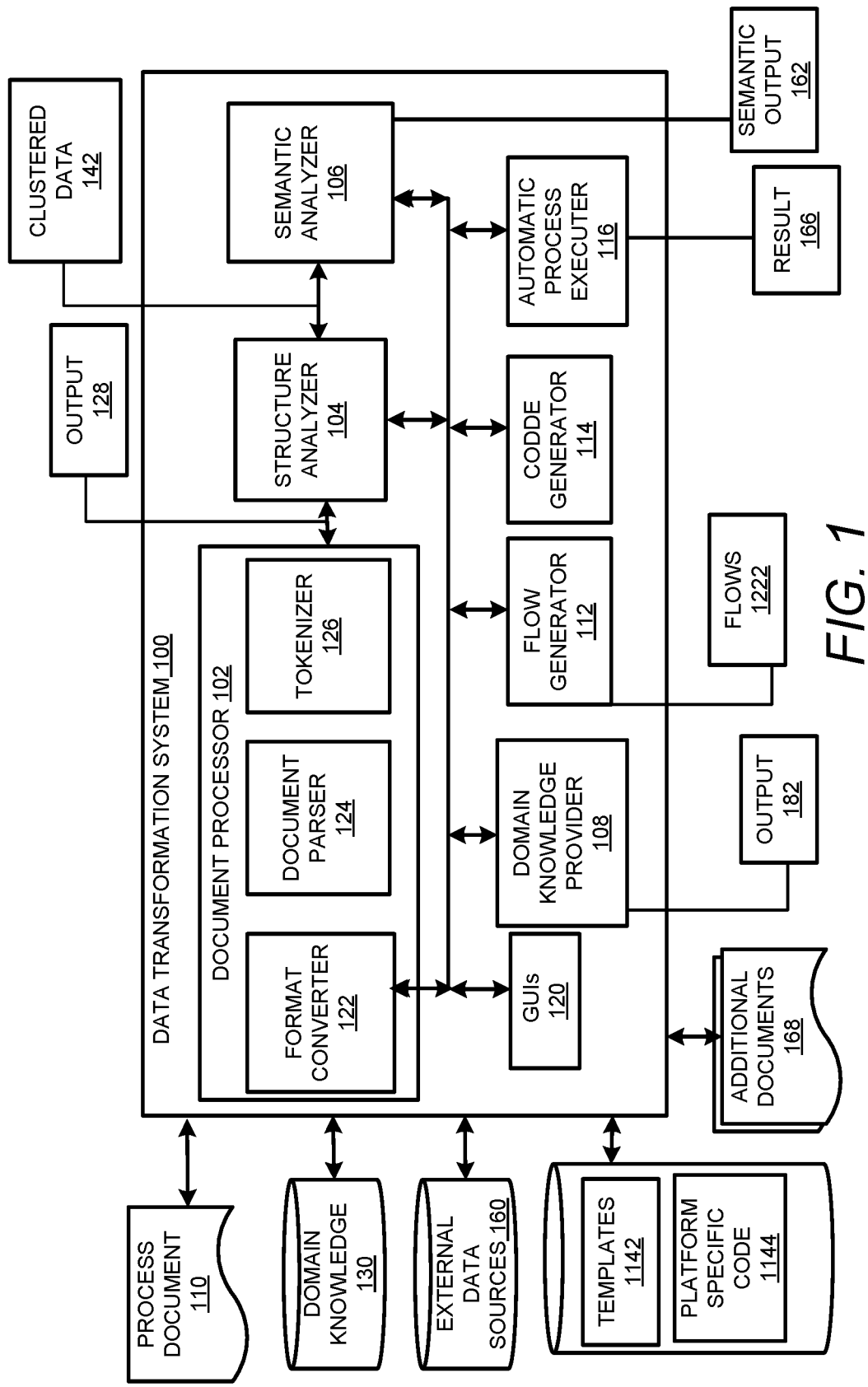
FIG. 1 is a block diagram that shows a data transformation system in accordance with examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

An Artificial Intelligence (AI) based data transformation system is disclosed in accordance with some examples detailed herein. The data transformation system is capable of gathering process-related information from process documents and automatically transforms the process-related information into processor-executable instructions which, when executed by a computer device, enable automatic execution of the processes. The data transformation system can receive process documents of various formats including processor-readable formats and non-processor readable formats. The process-related information is used to automatically build flows which represent a series of steps that detail the procedures which make up the processes to be automated. Further iterative feedback from the user is collected in response to outputs produced by the automatically executed processes. The flows associated with the processes can be further modified to produce based on the user feedback.

A document processor comprised in the data transformation system can receive the various kinds of process documents. A process document can include a document of hundreds or even thousands of pages detailing policies and procedures associated with executing tasks particular to a domain. For example, the process document can include a manual that details the rules for paying, denying or pending insurance claims. Accordingly, the process document can be provided to the data transformation system in a processor-readable format such as one or more of a word processor document, a spreadsheet, a database etc. or in a non-processor readable format such as a scanned image. The document processor receives the process document and if it is in a non-processor readable format, converts the process document into a processor-readable format using AI techniques such as optical character recognition (OCR). The process document thus obtained in a processor-readable format is parsed, tokenized and tagged for parts-of-speech (POS) for further structural and semantic analysis.

The data transformation system includes a structure analyzer which accesses the process document to obtain or identify the structural elements therewithin. The structural elements can include the data arrangements or structures used to organize the information within the process document. The data arrangement can include but is not limited to, pages, paragraphs, sub-sections, sections, bulleted points, lists, tables etc. Trained AI elements can be used to identify the structural elements. In some examples, textual formatting can be analyzed to identify structural elements. For example, bolded, italicized and/or underlined text may signify presence of a structural element at that position within the process document. In addition, one or more common parameter(s) can be extracted from the process document either from the structural elements or from the parsed and tokenized textual output from the document processor. The common parameter is used to cluster the data in the process document so that information organized or associated with the common parameter can be clustered together.

The clustered data is then semantically analyzed for identifying entities and entity attributes. More particularly, a semantic analyzer included within the data transformation system identifies context information such as intent at different levels. The intent information can be obtained at sentence level, paragraph level, section level document level etc. An intent can represent a task that is to be accomplished in some examples. AI classifiers can be employed to identify non-conditional and conditional statements. Chunkers are used to identify a 'when' situation conveyed in the conditional statements. The semantic analysis also includes taggers that are employed for named entity recognitions (NER). The superimposition of domain knowledge enables the identification of entities and entity attributes relevant to the particular domain.

The identification of the entities and entity attributes enable deducing the interactions therebetween. In an example, action words can be identified from the parsing and the Parts of Speech (POS) tagging which may be executed by the document processor. The flows can be automatically generated based for example, on the sequence of occurrences of the entities, conditional statements, action words etc. The flows can include simple flows including an action that affect an entity or an entity attribute. More complex flows involving multiple actions which serially and/or in parallel affect a number of entities and/or entity attributes can also be built. The flows thus generated enable automatically converting conditions to actions. In an example, multi sentence interpretation is employed to get procedural flow. The purpose or intent for each step of the non-conditional or procedural sentences is derived and underlying sub-patterns from the series of steps are used to obtain the context. Once the intent is identified, training can be employed to tag the intent with the appropriate domain-related terminology. The flows are then employed to automatically execute the process. In an example, the flows encode rules employed for the automatic execution of the process as detailed in the process document. The platform-specific code is then automatically generated by mapping the entities and the entity attributes to code templates. Platform-specific code can include processor-executable instructions that are generated for execution on a particular combination of software and/or hardware. The code thus generated is executed by a computing device for the automatic execution of the process.

In an example, a user can provide iterative feedback during the process execution. The iterative feedback can be used to update/enhance one or more of the flows. GUIs associated with the data transformation system can be used to output the flows for user validation. The user can approve or amend the flows. In an example, the GUI can show a flow corresponding to a procedure as a series of entity elements and operator elements connected together. The entity elements can represent entities identified from the process document. The operator elements can represent interactions or other operations between one or more of the entities and entity attributes. The process to be automatically executed can include a network of such flows. In an example, a procedure may be updated with minor changes. The user can accordingly amend the flow corresponding to the procedure to reflect the change. One or more of the entities, the entity attributes or the interactions therebetween can be changed by the user. Such changes from the user can be automatically updated to the underlying data transformation system and may affect one or more of the flows, the domain knowledge, contextual information, the structure of the process document etc.

The data transformation system as disclosed herein provides for the technical effect of transforming procedures encoded in voluminous manuals in the form of textual data into processor-executable code or instructions without the necessity for manually programming the computer. Process manuals or documents are thus automatically converted into knowledge substrates or instruction repositories for use by computing devices. The entities, attributes are automatically identified from the process document(s). The structural and semantic information is used to build the flows which can set rules based on which the process may be executed. Generally policy documents of a process focus on "how" to carry out a process and the policy documents are designed accordingly without explanations regarding "why" the actions are needed or a reasoning of each of the process steps. Moreover, knowledge substrates or domain knowledge extracted from subject matter experts (SMEs) can be incomplete or erroneous. Even after precisely modeling an automated process based on the SMEs' input, failures in the execution of the process can expose gaps in the SMEs' knowledge. The data transformation system disclosed herein automatically builds flows directly from the process documents thereby mitigated the need to rely on the SMEs for domain knowledge. In certain instances, an automated process can erroneous encode some procedures based on outdated process documents that the SME would like to override. The data transformation system described herein accommodates such needs by provisioning for human review and input via the iterative feedback. The outdated procedures or errors can be fixed by humans via validation of the flows thereby leveraging the human knowledge/experience in the process automation.

FIG. 1 is a block diagram that shows the data transformation system 100 in accordance with examples disclosed herein. The data transformation system 100 includes a document processor 102, a structure analyzer 104, semantic analyzer 106, domain knowledge provider 108, a flow generator 112, a code generator 114 and an process executer 116. Each of the elements of the data transformation system 100 such as the document processor 102 or the structure analyzer 104 etc., can present the output or receive input from a user via GUIs 120 that provide the user interaction points. Therefore, the user can monitor the intermediate output from the elements of the data transformation system 100 and provide explicit training if needed even at intermediate points during the automation of the process. As the data transformation system 100 can be constantly improved via iterative user feedback as detailed further infra, the need for the users to access the intermediate outputs reduces with increased usage and time.

The document processor 102 enables the data transformation system 100 to receive a process document 110. The process document 110 may have various formats that includes textual data for processing. In an example, the textual data can include not only letters, words etc. but also numbers, special characters etc. which are conveyed through one or more of word process documents, spreadsheets, images, database tables etc. The process document 110 can therefore include one or more of spreadsheets, formatted textual documents, plain text documents, images etc. which can be either in processor-readable formats or other formats that are not processor-readable such as images. In an example, the process document 110 can actually include a voluminous journal of hundreds or even thousands of pages detailing the procedures associated with a process to be automated. For example, the process document 110 can include a training manual that details procedures on how insurance claims are to be processed. The process document 110 can include various structural elements within which the textual data is arranged logically or formatted in a manner that conveys an intent.

A format converter 122 is included in the document processor 102 for executing procedures such as optical character recognition (OCR) in extracting textual and formatting data from those documents which are received in non-processor readable formats. The output from the format converter 122 can include a copy of a received document converted into processor-readable format. The document processor 102 can additionally include a document parser 124 which parses a received document and a tokenizer 126 which produces tokens from the received document. If a document is received in a processor-readable format then it can be directly parsed and tokenized without the need for format conversion. The document processor 102 can additionally include a parts of speech (POS) tagger (not shown) that tags the word tokens with POS information. It may be noted that unlike the text processing that occurs routinely wherein punctuation and stop word are ignored, the information extracted from the document processor 102 can include, textual formatting information, punctuation and/or stop words which are further employed for the recognition of the structural elements and for clustering the data as detailed further herein.

The parsed, tokenized and tagged output 128 from the document processor 102 in addition to the process document 110 can be transmitted to the structure analyzer 104 in order to identify the structural elements within the process document 110. The structural elements that can be identified by the structure analyzer 104 can include but are not limited to, location of particular words within a page (e.g., heading, sub-heading etc.), sentences, paragraphs, table of contents, lists, bulleted points, tables, intra-page and inter-page links, links to external data sources etc. The structural elements thus identified can be used to cluster the textual data within the process document 110 based on a common parameter. The common parameter can include both textual content such as words, phrases etc. or structural elements.

The clustered data 142 extracted from the various sections of the process document 110 by the structure analyzer 104 is provided to the semantic analyzer 106 which is configured to determine the intent conveyed in the various sentences/paragraphs of the process document 110. The semantic analyzer 106 can break up each page of the process document 110 into sentences, clauses etc. The semantic analyzer 106 further differentiates between the various types of sentences as described herein in order to determine the intent. The intent is therefore determined step-wise at various levels such as, clause level, sentence level, paragraph level, page level and document level. Intent detection can be based on a combination of various classifiers working in a pipeline that begin from clause level then to sentence level, then to paragraph level then to page level and finally to document level step-wise. Thus, classifiers can be trained for level-wise analysis. Each classifier can be built with its own set of linguistic, structural and statistical based features. For example, a linguistic feature such as co-references can help to connect multiple sentences together. In addition to analyzing the process document 110 at different levels, the semantic analyzer 106 further executes named entity recognition using dictionaries, mappings, taggers etc. in accordance with examples further described herein. The semantic output 162 which includes at least the named entities, attributes and intents is received by the domain knowledge provider 108.

The domain knowledge provider 108 further superimposes the domain knowledge 130 including ontology on top of the semantic output 162. The semantic output 162 can be initially normalized. For example, verb forms may be changed as part of normalization wherein 'paid' is transformed to 'pay' etc. It can be appreciated that the domain knowledge provider 108 enables fuzzy matching wherein different kinds of similarities and similarities to different extents are identified as opposed to an exact mapping between the textual data in the process document 110 and the domain knowledge 130. Therefore, if a term 'original claim' is identified from the textual data by the semantic analyzer 106 as an entity, the domain knowledge provider 108 can further enhance the information about the original claim entity by enabling identification of the normalized 'pay' as an attribute—'payment status'. The output 182 from the domain knowledge provider 108 which includes entities, attributes, normalized forms and other information that is now identified as part of the domain e.g., insurance claim processing domain is received by the flow generator 112.

The flow generator 112 generates flows 1222 which encode logical sequences of interactions that occur between the entities and the changes to the entity attributes that are caused by the interactions. The interactions symbolize the various procedures that are executed as part of the automated process. Accordingly, the flows 1222 when viewed by a user using one of the GUIs 120, can be represented as a network of nodes wherein the nodes symbolize the entities, the entity attributes and the operators that are acting on the entities/entity attributes. The flows 1222 can be edited by a user to add new entities and change attributes or operators as needed during user validation.

The code generator 114 enables generating platform specific code 1144 based on the flows 1222 upon validation by the user. For example, the platform specific code 1144 generated can include Java code that enables automatic execution of a process such as claims processing. Each of the entities, attributes and the operators included within the flows 1222 can be mapped to code templates 1142 that include the corresponding platform-specific code elements. The mapped code elements arranged in accordance with the flows 1222 can be produced as a code output 1444 of the code generator 114. As various types of sentences such as conditional or non-conditional statements, clause level intents etc. are identified, the same can be converted into the platform-specific code 1144 which can be used to execute the automated process. In an example, the flows 1222 can be converted to DROOLS rules. The various intermediate outputs from the data transformation system 100 can be stored to a local data store 140 of the data transformation system 100 for retrieval as needed.

A process executer 116 is also included in the data transformation system 100 for the automatic execution of the procedures as detailed in the process document 110 and encoded in the platform-specific code 1144. It can be appreciated that although the process executer 116 is shown to be part of the data transformation system 100, this is not necessary and that the process executer 116 can be separate from the data transformation system 100 and may even be executed by a remote computer. The process executer 116 can receive additional input such as additional documents 168 for processing. In an example, the process executer 116 can also access certain external data sources 160 for the automatic execution of the process.

Referring back to the example of claim processing, the additional documents 168 can include policy documents associated with a claim. Using the code 1144, the process executer 116 can identify values pertaining to the entities, entity attributes and the interactions therebetween from the additional documents 168. For example, the process executer 116 can obtain entity attribute values such as the subscriber's name, the policy number, the insurance plan details such as claim limits etc. Based on such details, the process executer 116 can determine whether or not the claim should be paid based on the rules and procedures as outlined in the process document 110. The process executer 116 may enable presentation of the result 166 on whether or not to pay the claim for review to a human user. The input from the human user can either affirm the result 166 from the process executer 116 or reject the result 166. The affirmation or rejection by the human user is recorded and processed for training purposes in accordance with the examples disclosed herein. If the result 166 from the process executer 116 is rejected by the human user, then further input either from the user or other users can be accessed and if needed, the data transformation system 100 can be updated. Therefore, if one or more procedures are updated since the process document 110 was generated, the updates can be provided to the data transformation system 100.

Figure 2:
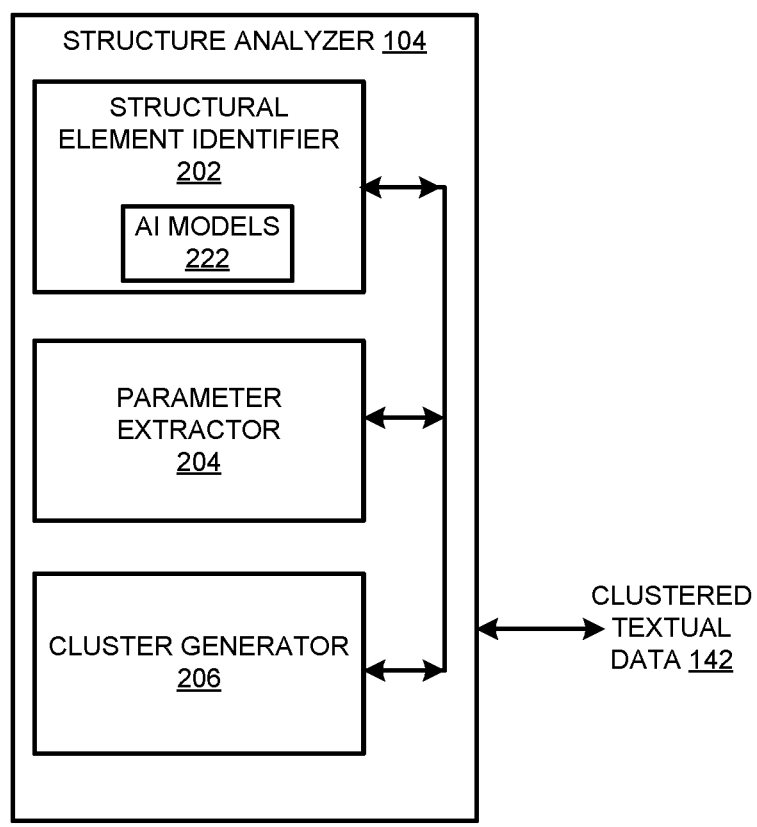
FIG. 2 shows a block diagram of a structure analyzer in accordance with the examples disclosed herein.

FIG. 2 shows a block diagram of the structure analyzer 104 in accordance with the examples disclosed herein. The structure analyzer 104 includes a structural element identifier 202 which can include trained AI models 222 to identify the various structural elements used to organize the data in the process document 110. By the way of illustration and not limitation, each structural element can have a corresponding one of the AI models 222 trained via supervised training for identifying that particular structural element. In an example, the trained AI models 222 can include various kinds of classifiers and/or taggers trained for specific feature selections for detecting headings, sub-headings, lists, tables etc. As mentioned herein, the structural information thus identified may not only include textual data arrangements such as lists, tables or other hierarchical data arrangements etc. but can also include textual formatting information such as, titles, sub-titles, section, sub-section, indentations, as indicated by the textual data such as but not limited to font face, font size, font styles including bold, italicized or underlined font etc.

The structure analyzer 104 can also include a parameter extractor 204 and a cluster generator 206. The parameter extractor 204 can extract common parameters from the process document 110 processed by the document processor 102. For example, the parsed, tokenized output of the document processor 102 can be further processed and techniques such as but not limited to, term frequency etc. can be employed by the parameter extractor 204 to extract the parameters for clustering from the textual data in the process document 110. The common parameter can also include a structural element. For example, textual data arranged in one of a section, a sub-section, a list or a table etc. can be clustered together based on a common structural element. The common parameter can also include words, phrases or clauses extracted from the data in the process document 100. For example, the textual data regarding a particular proper noun can be clustered based on that proper noun. It can be appreciated that a data element from the process document 110 can thus belong to multiple clusters that are formed based on different common parameters. Referring to the example of insurance claim processing, the textual data related to processing insurance claims within a particular state e.g., Illinois can be gathered into one cluster. Methods such as K-means clustering can be employed by the cluster generator 206 for generating the clusters based on the common parameter(s) identified from the textual data in the process document 110.

Figure 3:
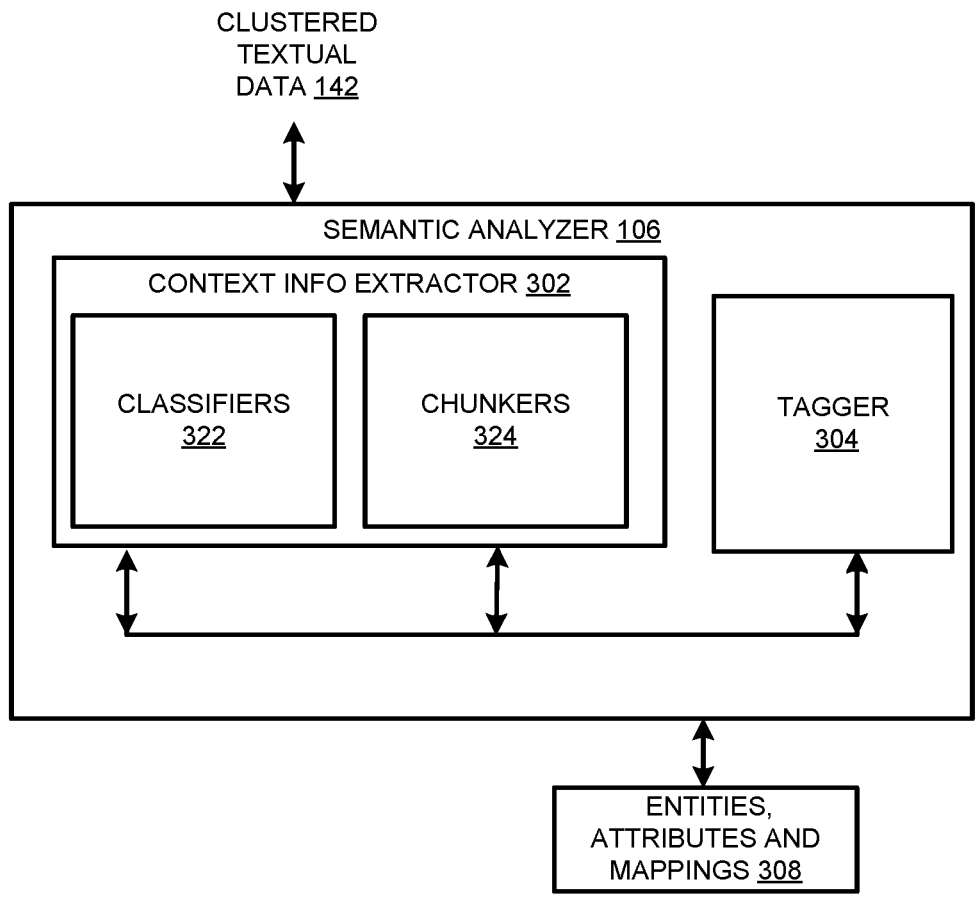
FIG. 3 shows a block diagram of a semantic analyzer in accordance with the examples disclosed herein.

FIG. 3 shows a block diagram of the semantic analyzer 106 in accordance with the examples disclosed herein. The semantic analyzer 106 further includes a context information extractor 302 and a tagger 304. The context information extractor 302 further includes classifiers 322 and chunkers 324. The semantic analyzer 106 enables the data transformation system 100 to determine the intent of each sentence in the process document 110 in a manner that enables generating the flows 1222 and the corresponding platform-specific code 1144. The context information extractor 302 can be configured to determine the context information which includes the intent at various levels as described herein.

The context information extractor 302 analyzes the process document 110 at word level, clause level, sentence level, page level and document level and determines the corresponding intent at that level. Various types of sentences including conditional sentences and non-conditional or procedural sentences which do not include any conditions can be identified in the process document 110 by the classifiers 322. The classifiers 322 can be trained to identify the different types of conditions and procedural sentences that include no conditions. The chunkers 324 can be used to identify a 'when' part of the condition. For example, a sentence if the original claim is paid . . . ' is identified as a conditional sentence by the classifiers 322 and the part of the sentence before paid can be identified as a response to 'when' by the chunkers 324. In an example, the chunkers 324 can be natural language processing (NLP) elements that are used to breakdown the process document 110 at different levels. The semantic analyzer 106 further includes a tagger 304 which is used for named entity recognition (NER). The tagger 304 can also be used for identifying dictionaries and mappings between the entities and entity attributes based on the dictionaries. The output 308 from the semantic analyzer 106 can therefore include the entities, the entity attributes and the mappings between the entities, entity attributes and the relationships therebetween as identified from the process document 110.

Figure 4:
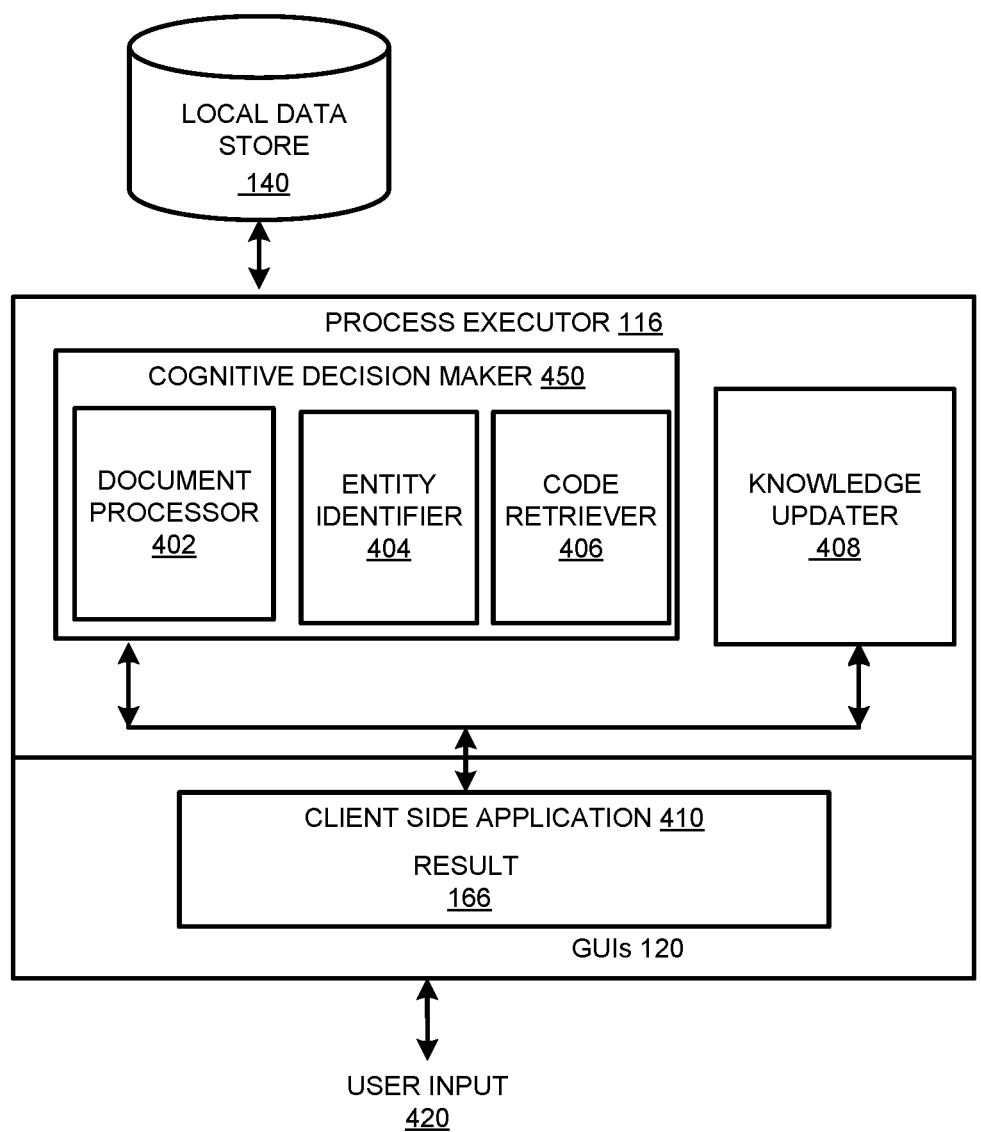
FIG. 4 shows a block diagram of a process executer in accordance with the examples disclosed herein.

FIG. 4 shows a block diagram of the process executer 116 in accordance with the examples disclosed herein. The process executer 116 receives additional input such as the additional documents 168, executes automated procedures using the code 1144 to produce a result 166 in accordance with the flows 1222. By the way of illustration and not limitation, the process of claim settlement is discussed herein for better describing the functionality of the process executer 116 and how the process executer 116 is enabled in this process by the data transformation system 100. However, it can be understood that the process executer 116 be similarly used to automatically execute other processes based on the rules and flows 1222 generated by the data transformation system 100 from a given document. Accordingly, the result 166 can pertain to whether or not a claim should be paid based on policy documents (i.e, the additional documents 168) received by the process executer 116. When the policy documents are initially received, they are processed by the cognitive decision maker 450 to determine a payment status for the claim.

The cognitive decision maker 450 can include a policy document processor 402 can initially parse the policy documents 1116 to obtain the entity and entity attributes. In the example of claim settlement, the entities can include a subscriber, a claim, a policy and related attributes such as but not limited to name of the subscriber, policy number, claim number, payment status, request date, policy active/inactive status etc. The entity identifier 404 identifies the various entities and their attribute values using, for example, text processing and pattern matching techniques. The data extracted from the policy documents can be compared with the data retrieved from the external data sources 160 for identifying the entities, the entity attributes and other values from the policy documents. Furthermore, a code retriever 406 can further substitute the entity and attribute values in the corresponding platform-specific code 1144 to execute the process of claim settlement automatically to produce the result 116 determining whether or not to pay the claim.

The result 166 can be displayed to a user such as an SME for validation on one of the GUIs 120 which can include a client side application 410. The client side application 410 can be communicatively coupled to the local data store 140 via a knowledge updater 408 that transmits the user input 420 validating or rejecting the result 166. Either case can be treated as a training data for the process executer 116. However, when the result 166 is rejected by the user, further processes can be instituted. In an example, the knowledge updater 408 can be further configured to compare a received user input to inputs provided by other users to similar claims. If the user input is contrary to the inputs provided by the other users, then, the supervisor of the user providing the user input 420 can be contacted and/or the user providing the user input 420 can be made aware of the discrepancy based on comparison of the user input with inputs from the other senior users and further information can be requested. The user's response can include additional or updated documentation justifying the user input 420 which can be used to update the local data store 140.

Figure 5:
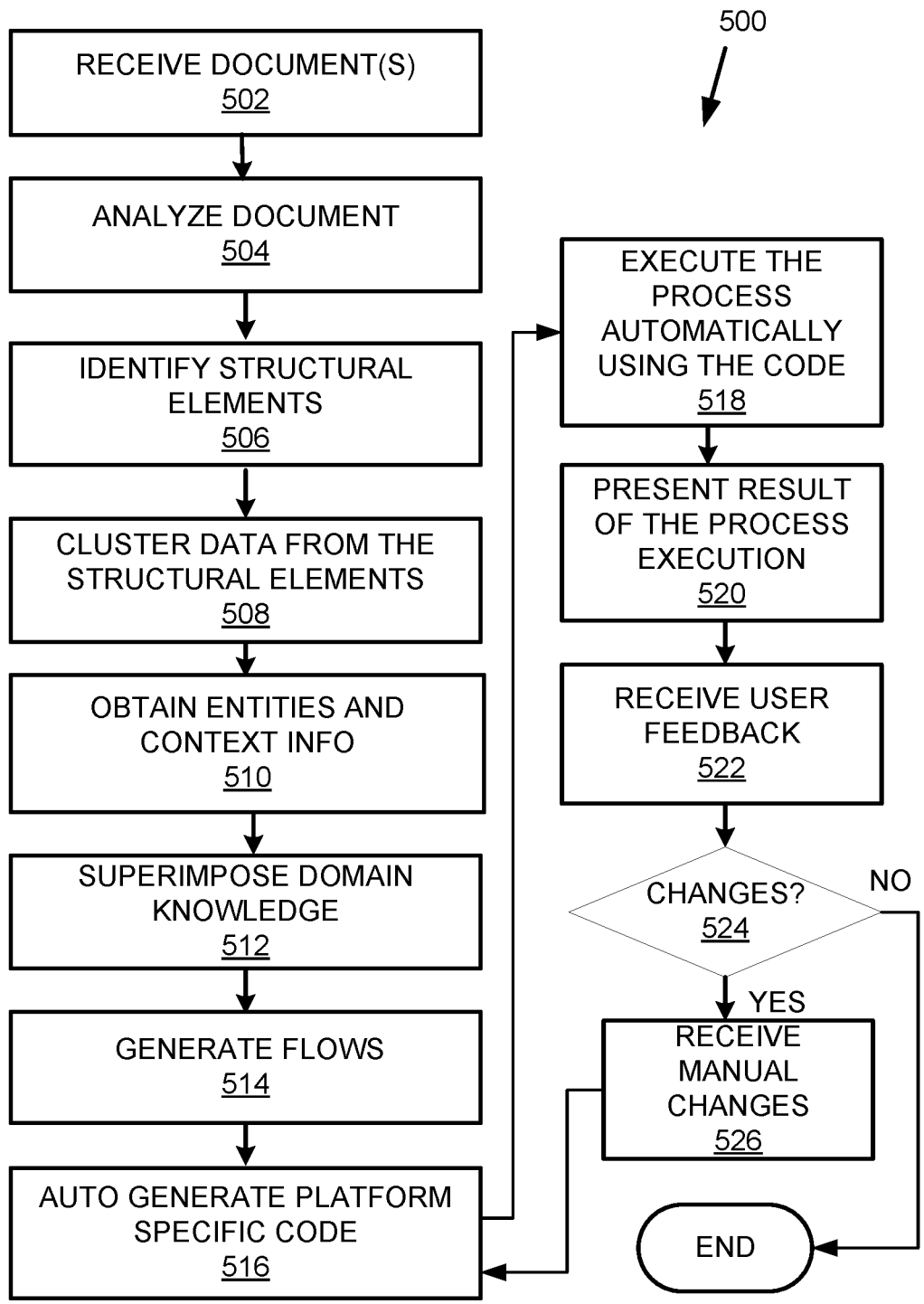
FIG. 5 shows a flowchart that details a method of automatically executing processes based on a process document in accordance with the examples disclosed herein.

FIG. 5 shows a flowchart 500 that details a method of automatically executing processes based on the process document 110 in accordance with the examples disclosed herein. The method begins at 502 with receiving the process document 110 detailing the procedures that are part of the process to be automatically executed by the process executer 116. At 504, the process document 110 is analyzed for format and content requirements. The process document 110 is parsed and tokenized if it is in a processor-readable format, else the process document 110 is initially converted into the processor-readable format for parsing and tokenizing purposes. The data transformation system 100 not only gathers the content information from the process document 110 but also gathers the formatting information or structural information wherein the structural elements of the process document are identified at 506. As mentioned herein, trained AI models 222 can be employed to identify the various structural elements in the process document 110.

The data thus obtained from the process document 110 can be clustered based on a common parameter at 508. The common parameter can include a structural element or a textual data element such as a word, a phrase, a clause etc. obtained from the process document 110. The data can be clustered based on whether the data was included within a common structural element such as information taken from a paragraph, a sub-section, a section, a list, a table or information obtained via following the intra-document references etc. The clustered data 142 is then analyzed semantically at 510 to identify the entities and the context information such as intents at various levels using classifiers 322, identifying the procedural steps when one or more actions are to be executed using chunkers 324 and a tagger 304 for named entity extraction. The output from the semantic analysis is further superimposed with the domain knowledge 130 at 512 for further establishing the interactions within the entities and the attributes thereby building flows 1222 at 514. Superimposition of the domain knowledge can include connecting actions and/entities. For example, a phrase from the process document 110 can include an instruction "close claim". The classifiers 322 can recognize 'close' as an action and 'claim' as an entity. It is the domain knowledge 130 that specifies the exact procedures to be implemented when the action 'close' is encountered. The domain knowledge 130 may specify a particular queue and a specific action code that is to be assigned.

The flows 1222 corresponding to the actions that are to be executed can be visually presented on one of the GUIs 120 so that a user can view and make changes if needed. In an example, a flow can be displayed as a flow diagram which includes a network of nodes wherein the nodes represent the entities, the entity attributes and the actions that are to be executed using the entities. The automated process can include multiple flows which interact with each other depending on various conditions as detailed in the document. When one or more procedures are changed, an updated process document can be provided to the data transformation system 100 for generation of new flows as described herein. Alternately, minor changes to the procedures that make up the process can be manually updated via changing the flow diagram.

The platform specific code for the automatic execution of the process is automatically generated at 516. In an example, external files and templates that have platform specific mappings to the entities relations, flows, actions and conditions are used for the automatic code generation. Accordingly, processor-executable instructions for the process to be automated are also automatically generated at 516. The process is automatically executed at 518 by automatically executing the code generated at 516.

A process for iterative feedback is further implemented by the data transformation system 100 to generate results with greater accuracy. Therefore, the result 166 produced by the automatically executed process at 518 is presented to the user for validation at 520. The user's feedback either validating the result 166 or rejecting the result is received at 520. If the user validates the result 166 then it is determined at 524 that no further changes are required in the platform-specific code and the method terminates on the end block. If the user rejects the result 166, then it is determined at 524 that further changes are required. Accordingly, the manual changes are received at 526 and the method returns to 516 for automatically updating/generating the platform specific code corresponding to the manual changes received at 526. The method then proceeds to execute the automatic process at 518 in accordance with the updated code. The updated result is again presented to the user for review. Thus, the process can be tweaked until a desired accuracy is obtained in the results from the automatically executed processes.

Figure 6:
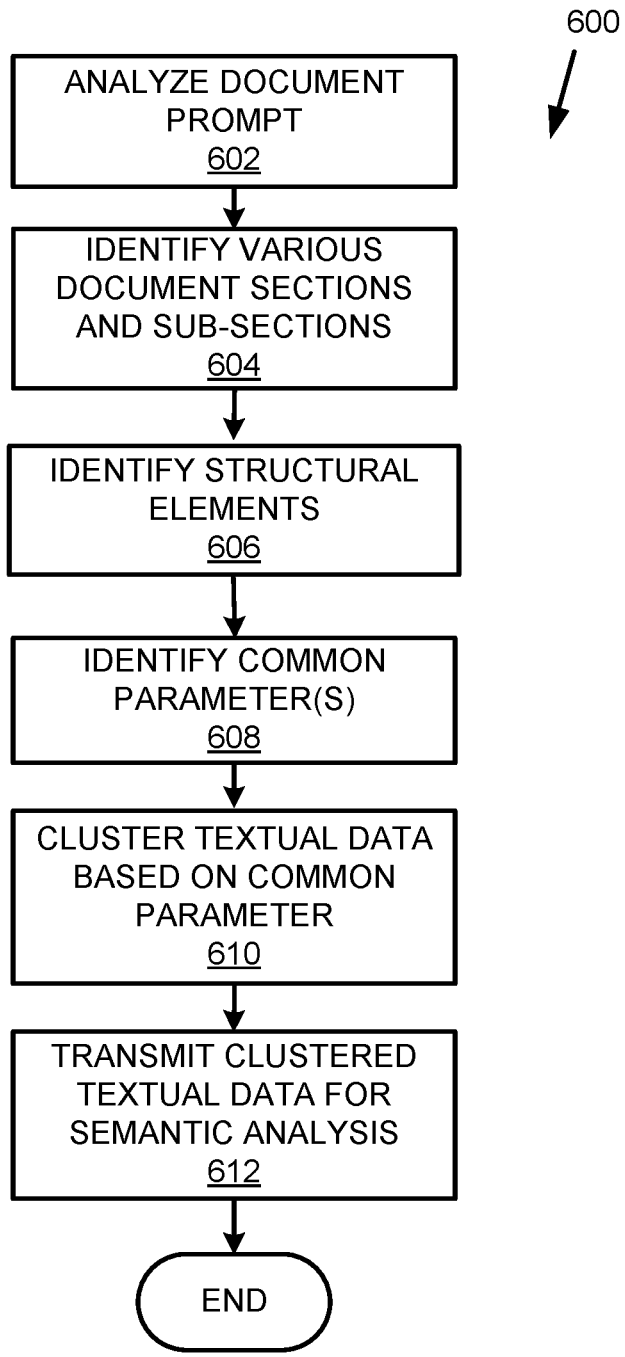
FIG. 6 shows a flowchart that details a method of analyzing the structure of the process document in accordance with the examples disclosed herein.

FIG. 6 shows a flowchart 600 that details a method of analyzing the structure of the process document 110 in accordance with the examples disclosed herein. Various portions of the process document 110 including the formatting of the data such as sentences, punctuation such as commas, periods, hyphens, spaces, tabs, stop words, links etc. are included in the analysis to recognize structures such as clauses, sentences, paragraphs, sub-sections and sections within a given page of the process document 110. At 602, the document prompt wherein the name of the prompt may be written at the top of the page is analyzed for determining the intent. At 604, the various document sub-sections and sections are identified. The sub-sections and sections can be identified via the corresponding headings and determining the size and font style of the characters used for the headings of the sub-sections and sections. In an example, the sub-sections and sections can be organized as lists and therefore, the numerals or characters used for identifying the list items can be used in the identification. In an example, techniques such as OCR where applicable or comparison of characters from the process document 110 with the character libraries can be executed for recognizing the character attributes such as font style, font size, font face etc.

At 606 the various structural elements such as lists, tables, outer links like href tags which provide downloadable content and the like are identified. In an example, various trained AI models 222 can be employed for recognizing the various structural elements. At 608, one or more common parameters are identified for clustering the data. In an example, the common parameters can be explicitly provided by the user using the GUIs 120. In an example, the common parameters can be identified based on, for example, term frequency of a page/pages within the process document 110. In an example, default common parameters including structural elements such as lists, tables, indented texts or other page layout features can be set up. At 610, the textual data from the process document 110 is clustered based on the common parameters that are set up for the process document 110. In an example, unsupervised NLP models, topic modeling and co-reference resolution and the like can be used for the clustering. The clustered data from the process document 110 is transmitted for semantic analysis at 612.

Figure 7A:
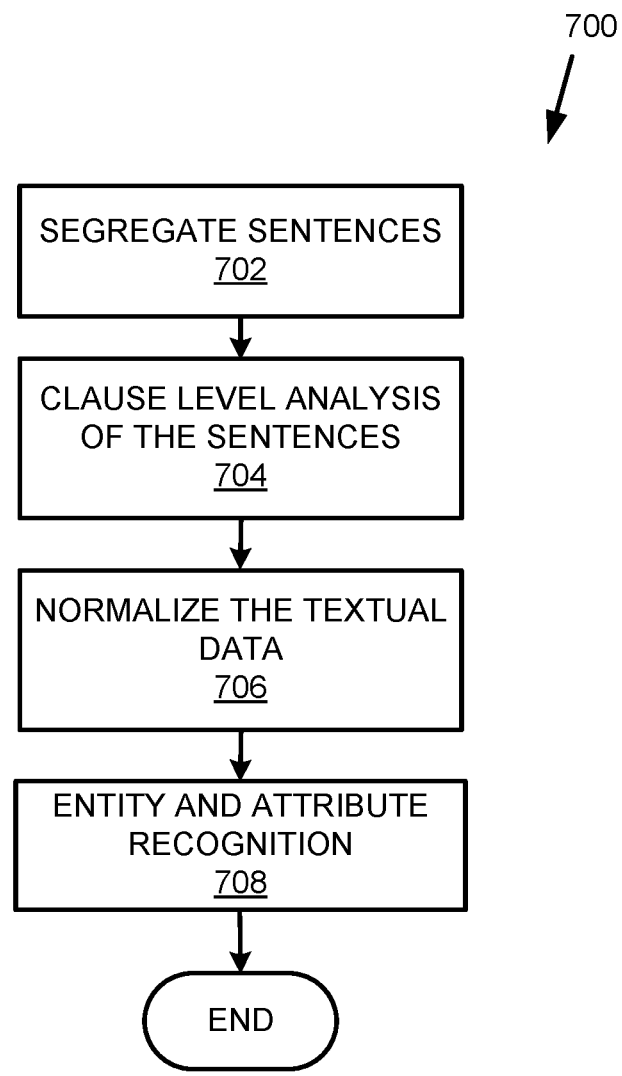
FIG. 7A shows a flowchart that details the semantic analysis of the process document in accordance with the examples disclosed herein

FIG. 7A shows a flowchart 700 that details the semantic analysis of the process document 110 for analyzing the process document 110 at various levels in accordance with the examples disclosed herein. The semantic analysis of the process document 110 can include initially segregating the various sentences using classifiers at 702. The sentences can include simple informational sentences, procedural sentences which detail the various actions to be executed or conditional sentences which detail one or more rules or conditions that are to be satisfied by the entities and the entity attributes values found in the additional documents 168. At 704, the sentences identified at 702 are broken up and analyzed at clause levels. In an example, a single sentence can be analyzed as having two clauses—a 'when' clause and a 'then' clause. In an example, the chunkers 324 can execute verb phrase chunking. Other clauses can also be identified by the chunkers 324 in accordance with some examples. The textual information thus obtained from the process document 110 can be normalized at 706 to aid the entity and attribute recognition. The semantic analysis then moves to entity recognition at 708 which can be executed using named entity recognition (NER) techniques. In an example, the POS tagging data from the document processor 102 can be employed for the entity and attribute recognition.

Figure 7B:
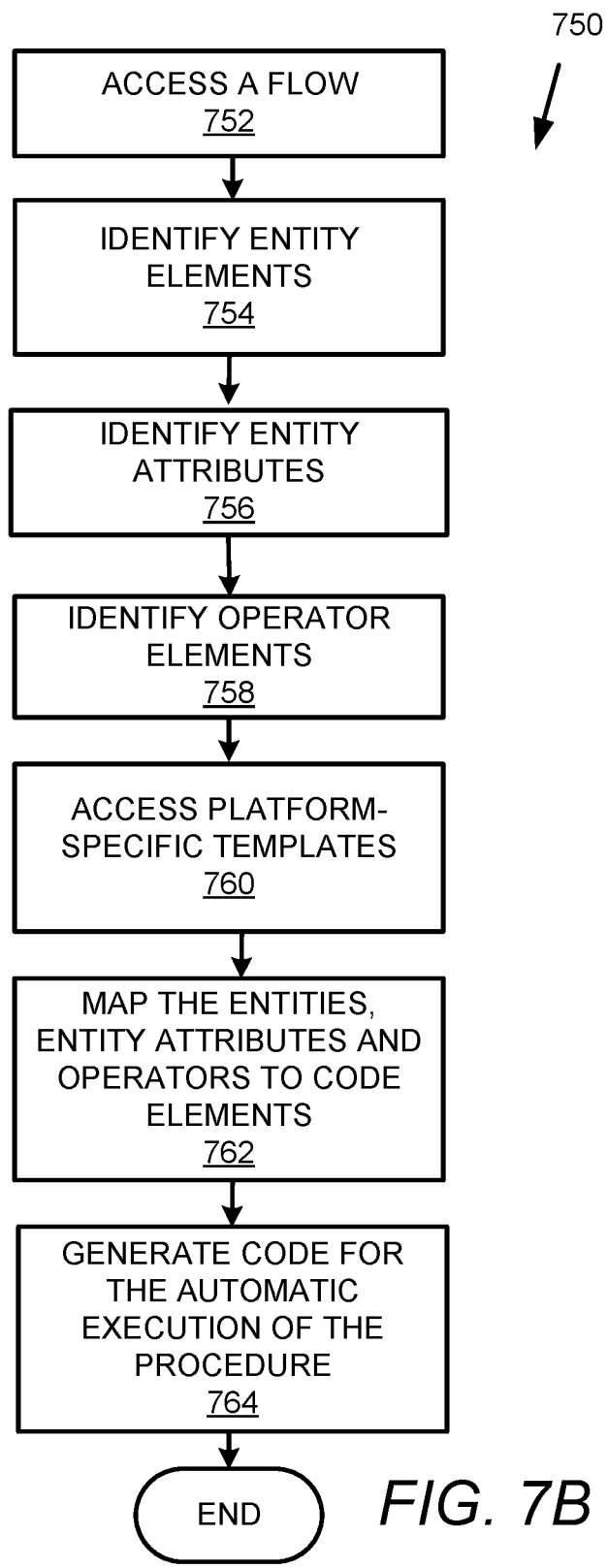
FIG. 7B shows a flowchart that details a method of generating platform-specific code for a given flow in accordance with the examples disclosed herein.

FIG. 7B shows a flowchart 750 that details a method of generating platform-specific code for a given flow in accordance with the examples disclosed herein. The method begins at 752 wherein a flow including one or more of the entity elements and operator elements corresponding to a procedure is accessed. The entity elements are identified at 754. In an example, the domain knowledge 130 that is superimposed upon the entity recognition by the semantic analyzer 106 enables identifying entity elements in the flow. Referring again to the example of the claim settlement process, based on the domain knowledge and language processing techniques, entities such as subscribers, claims, plans, etc. can be identified from the flow. Entity attributes can be identified from the normalized data extracted from the process document at 756. At 758 the various operator elements in the flow are identified. Verbs identified in clauses or the sentences can be mapped to operator elements in some examples. The entities and the entity attributes affected by the verbs are also identified at 758. At 760, the platform-specific templates that include code elements that are to be mapped to the flows are accessed. The entities, the entity attributes and the operators included in the flow are mapped to the corresponding code elements at 762. The code for the automatic execution of a procedure corresponding to the flow is generated at 764 based on the mapping.

Figure 8:
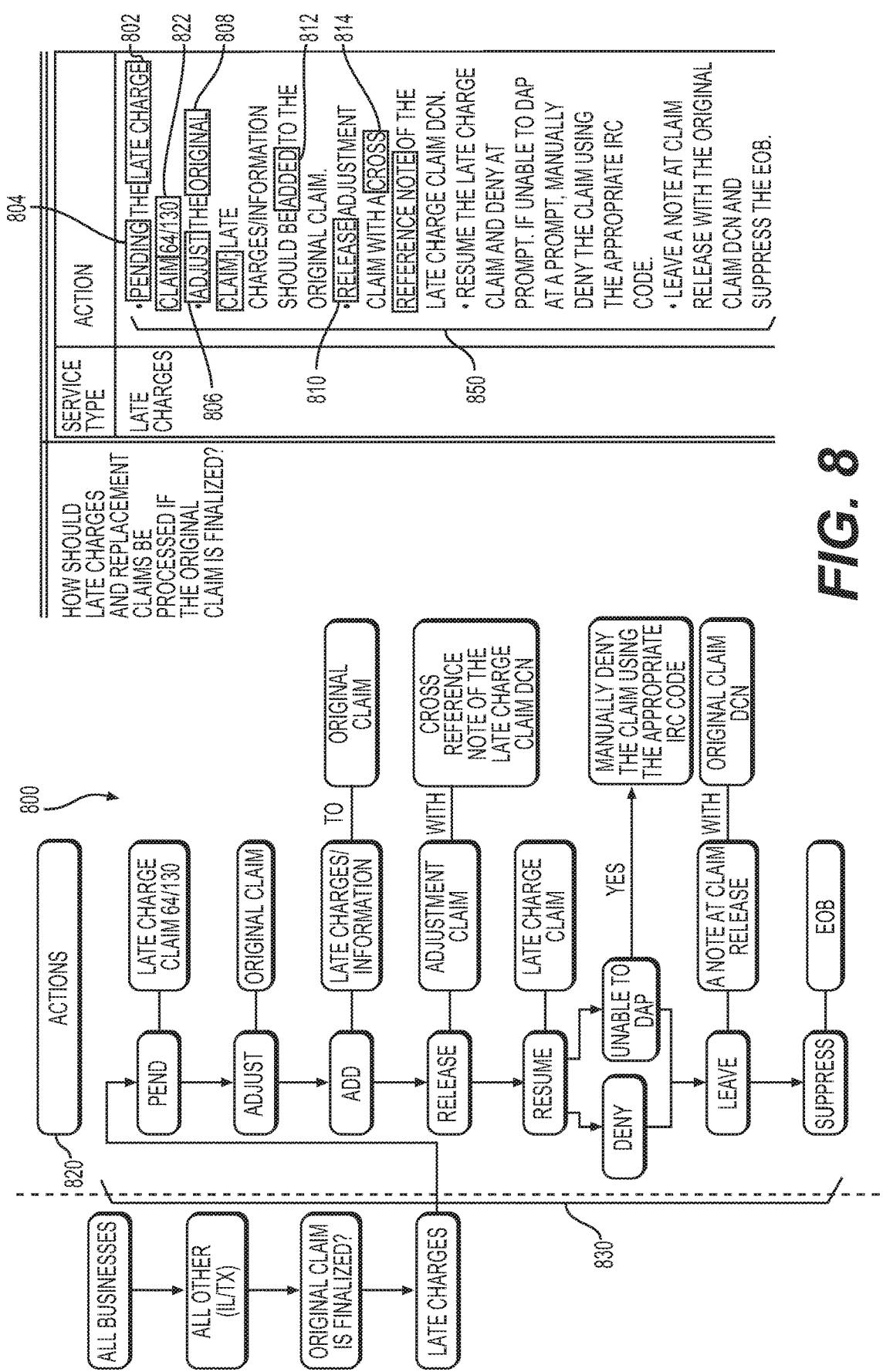
FIG. 8 shows a flow of various entities, entity attributes and entity interactions that are identified in accordance with the examples disclosed herein.

FIG. 8 shows a flow 800 wherein the various entities, entity attributes and entity interactions that are identified from a block of textual data 850 in a process document. An entity late charge claim 802 having a claim number attribute 822 806 with a value 822 of '64/130' is initially identified and a pend action 804 associated with setting the status to 'pending' for the late charge claim is also identified. A next adjustment action 806 for adjusting another corresponding original claim entity 808 is also identified in the next step. Subsequent actions to add 812 late charge information to the original claim entity 806, release 810 the adjust claim with another entity of a cross reference note 814 of the late charge claim 802 are also identified. Similarly, NLP, NER and other AI techniques are applied to the block of textual data 850 to identify the resume action, deny action, leave action and suppress action that are to be effected on the late charge entity 802. It may be appreciated that the flow 800 with the various actions 820 corresponding to those identified from the textual data 800 is shown for illustration purposes only and that the flow diagrams that are displayed to the user include entity elements, operator elements etc. that can be manipulated on a whiteboard as illustrated in diagrams described below. The data transformation system 100 thus receives a textual block 850 as input via the process document 110. The textual block 850 is then converted automatically into processor-executable instructions for the platform-specific code 1144 for executing the procedures as detailed within the flowchart 830.

Figure 9A:
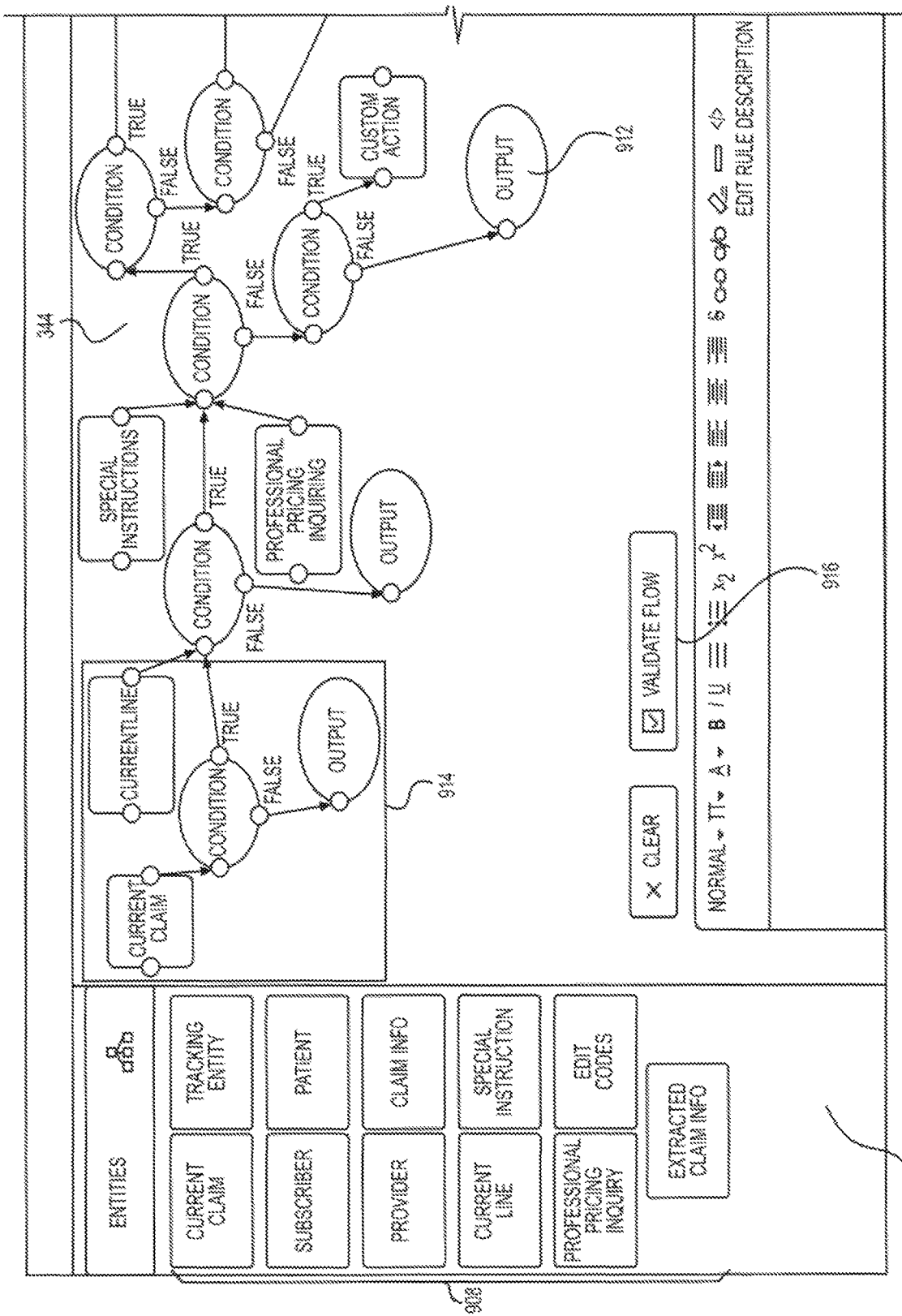
FIG. 9A shows an example drag-and-drop graphical user interface (GUI) of one of the GUIs that enables generating flows in accordance with the examples disclosed herein.
Figure 9A:
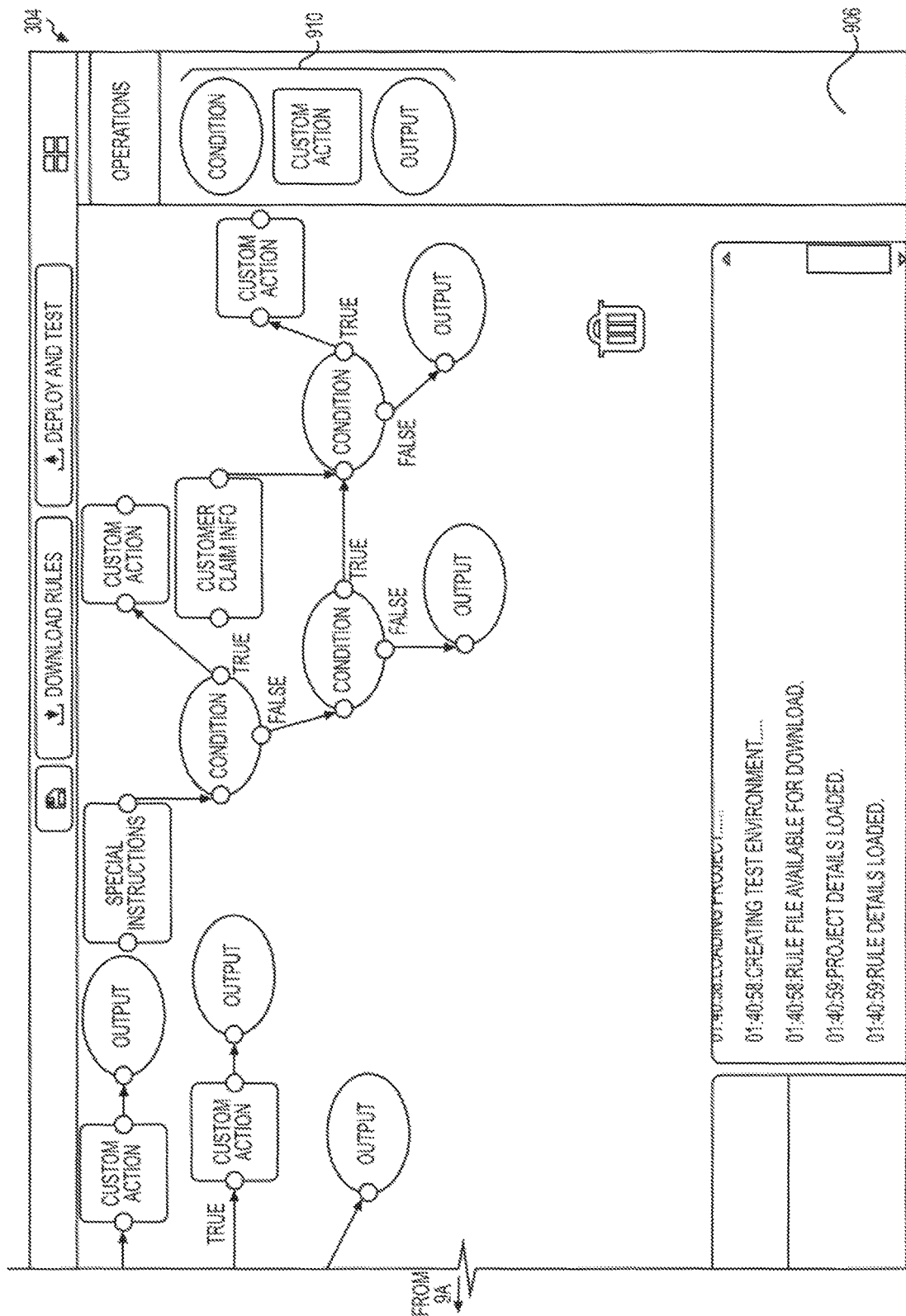

FIG. 9A shows an example drag-and-drop GUI of one of the GUIs 120 that enables generating flows in accordance with the examples disclosed herein. The drag-and-drop GUI 900 includes an entity panel 902 that enables entity selection, the whiteboard 904 and the operators panel 906 associated with the operator provider 916. The entity panel 902 includes entity elements 908 associated with the various entities extracted from the domain knowledge 130 associated with the health insurance domain. The entities include but are not limited to, current claim, subscriber, provider, patient, extracted claim info and the like. The operators panel 906 includes operator elements 910 such as a condition, a custom action and an output. The rule flow 912 can be automatically built based on the entities, entity attributes and actions extracted from the process document 110. For example, the entities and actions extracted from the process document 110 as shown above in FIG. 8 can be mapped to the corresponding entity elements 908 and operator elements 910 for generating the rule flow 912. The rule flow 912 enables the user to review that the entities, the entity attributes and the actions extracted from the process document and to make any updates/changes if needed. However, it can be appreciated that the user does not necessarily have to view/review the rule flow 912. Rather, the user may feed in the process document 110 to the data transformation system 100 and directly review the result 166 without inspecting the intermediate rule flow 912.

The rule flow 912 can be edited by the user by dragging and dropping user selections of the entity elements 908 and the operator elements 910 from the respective panels on to the whiteboard 344. For example, the construct 914 includes a condition operating on the current claim entity wherein if the condition is true, the rule flow 912 specifies another condition along with another entity, current line, to be examined while the condition if false the output is produced. The rule flow 912 thus proceeds until a final condition is examined. The rule flow 912 can include certain custom actions. The validate flow button 916 enables validating the rule flow 912 thereby enabling automatic generation of the code based on the rule flow 912.

Figure 9B:
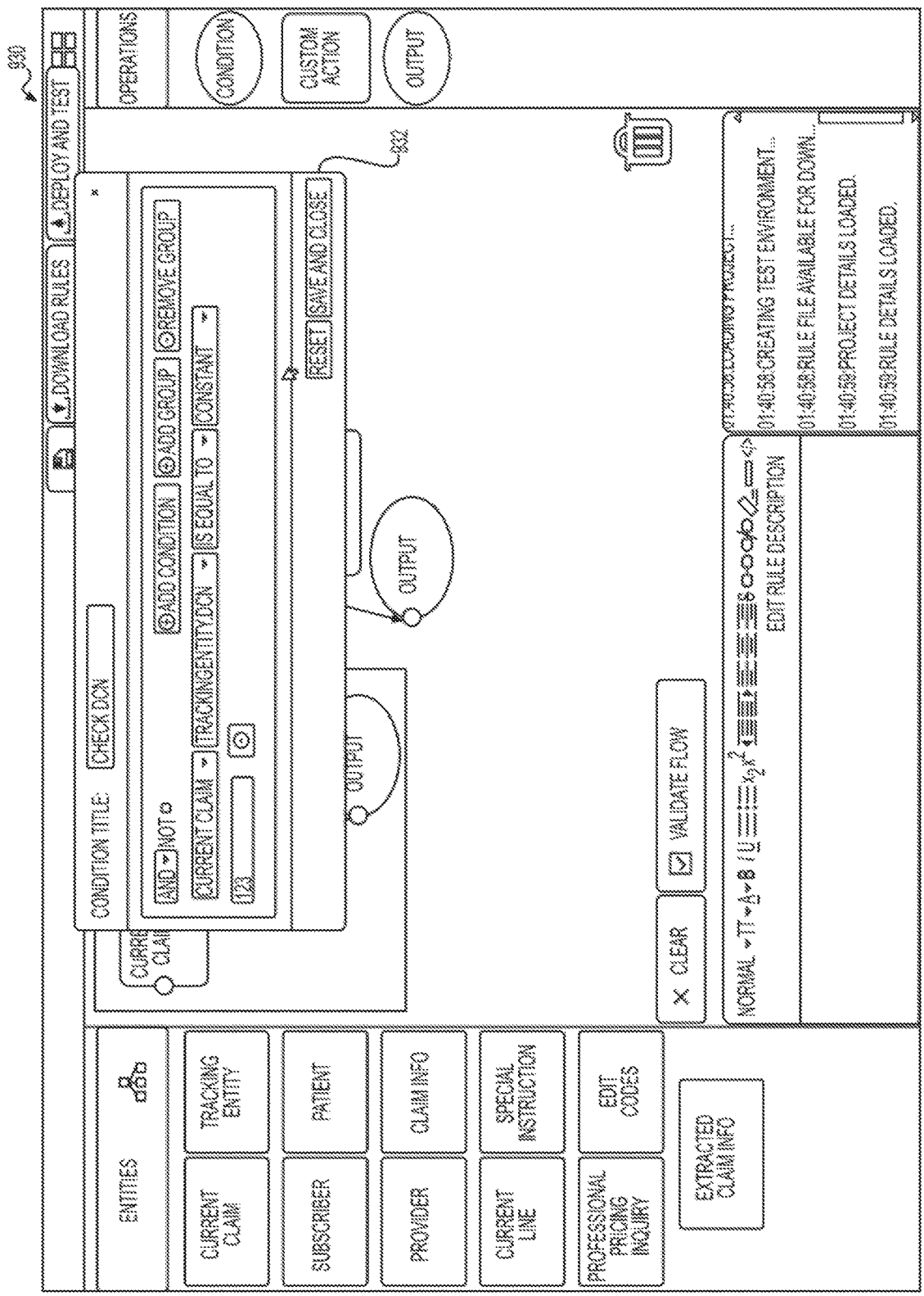
FIG. 9B shows the condition user interface (UI) that is employed by the user to enter the details of a condition to be implemented within the rule flow in accordance with the examples disclosed herein.

FIG. 9B shows the condition UI 930 that is employed by the user to enter the details of a condition to be implemented within the rule flow 912. The condition is to be implemented on the current claim entity to check if an attribute DCN' is equal to a constant '123'. Upon entering the condition, the user can click the 'save and close' button 932 in order that the condition is added to the rule flow 912.

Figure 9C:
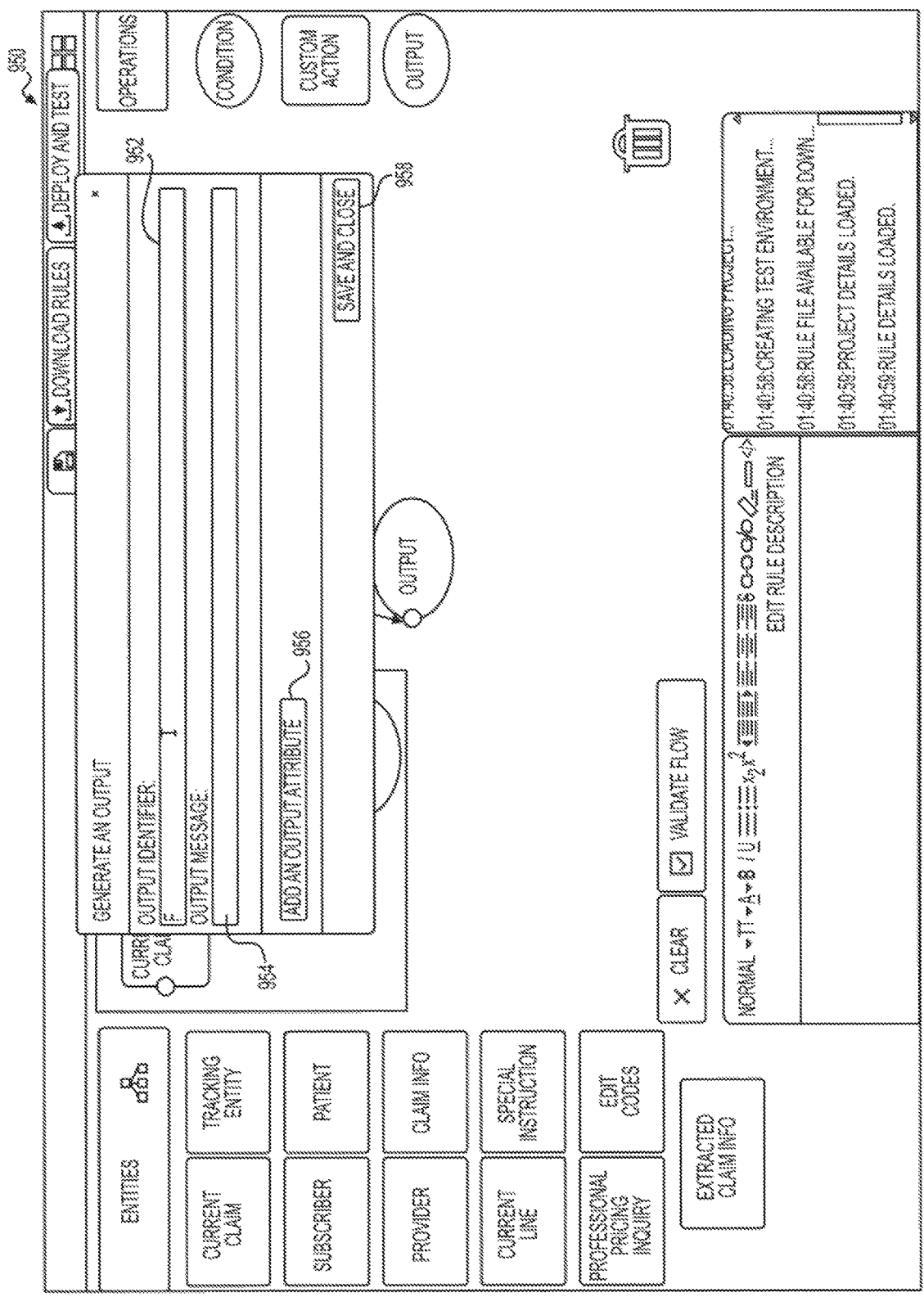
FIG. 9C shows an output GUI that enables a user to define an output to a condition within the rule flow in accordance with the examples disclosed herein.

FIG. 9C shows an output GUI 950 that enables the user to define an output to a condition within the rule flow 912. The output GUI 950 includes an output identifier 952, an output message 954 in addition to enabling the user to add an output attribute via an output attribute button 956. The changes made can be stored via clicking the save and close button 958. The user interfaces 930 and 950 can be accessed, for example, by double clicking the respective condition element or the output elements in the whiteboard 344.

Figure 10:
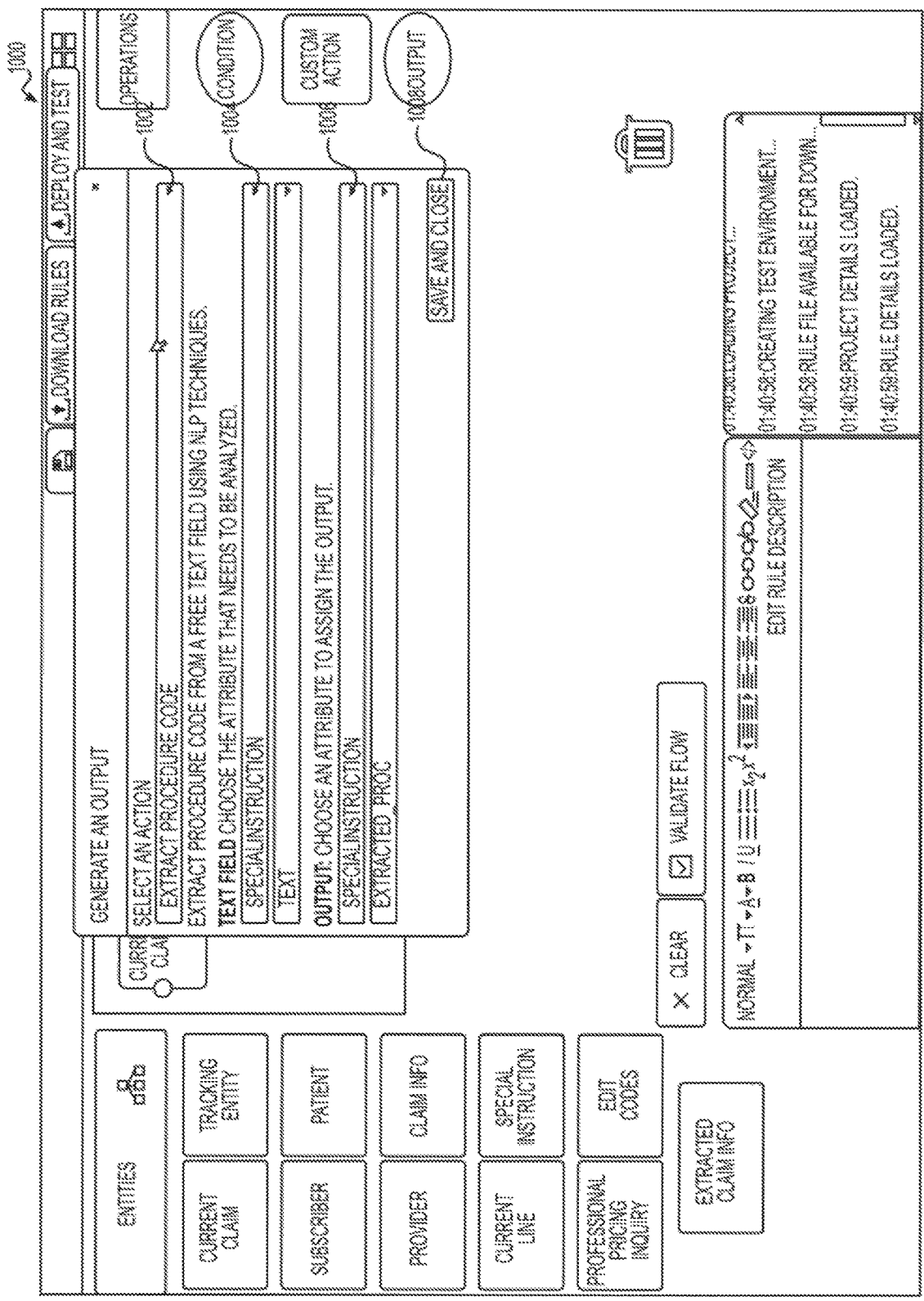
FIG. 10 shows a custom action UI that enables a user to access the custom actions in accordance with the examples disclosed herein.

Custom actions can include third-party code modules that enable execution of functions associated, for example, with probabilistic rules. By the way of illustration and not limitation, a probabilistic rule can include a condition for which the fulfilment depends on the sentiment of an article. In this case, the custom action(s) can include at least the natural language processing (NLP) of the body of text which is input to the condition and the sentiment analysis associated with the body of text. FIG. 10 shows a custom action UI 1000 that enables a user to access the custom actions in accordance with the examples disclosed herein. Certain custom actions can be available for user selection, based for example, on the user's choice of domain. In this case, based on the domain choice of health insurance, a custom action for extracting the procedure code from a free text field using NLP techniques is available and selected by the user as shown in the selection box 1002. The free text field from which the procedure code is to be extracted is selected in the field selection box 1004. The attribute to assign the output of the custom action is selected at the attribute selection box 1006.

The selection of the custom action and the related information is stored under the rule flow 912 upon the user clicking the 'Save and Close' button 1008.

Figure 11:
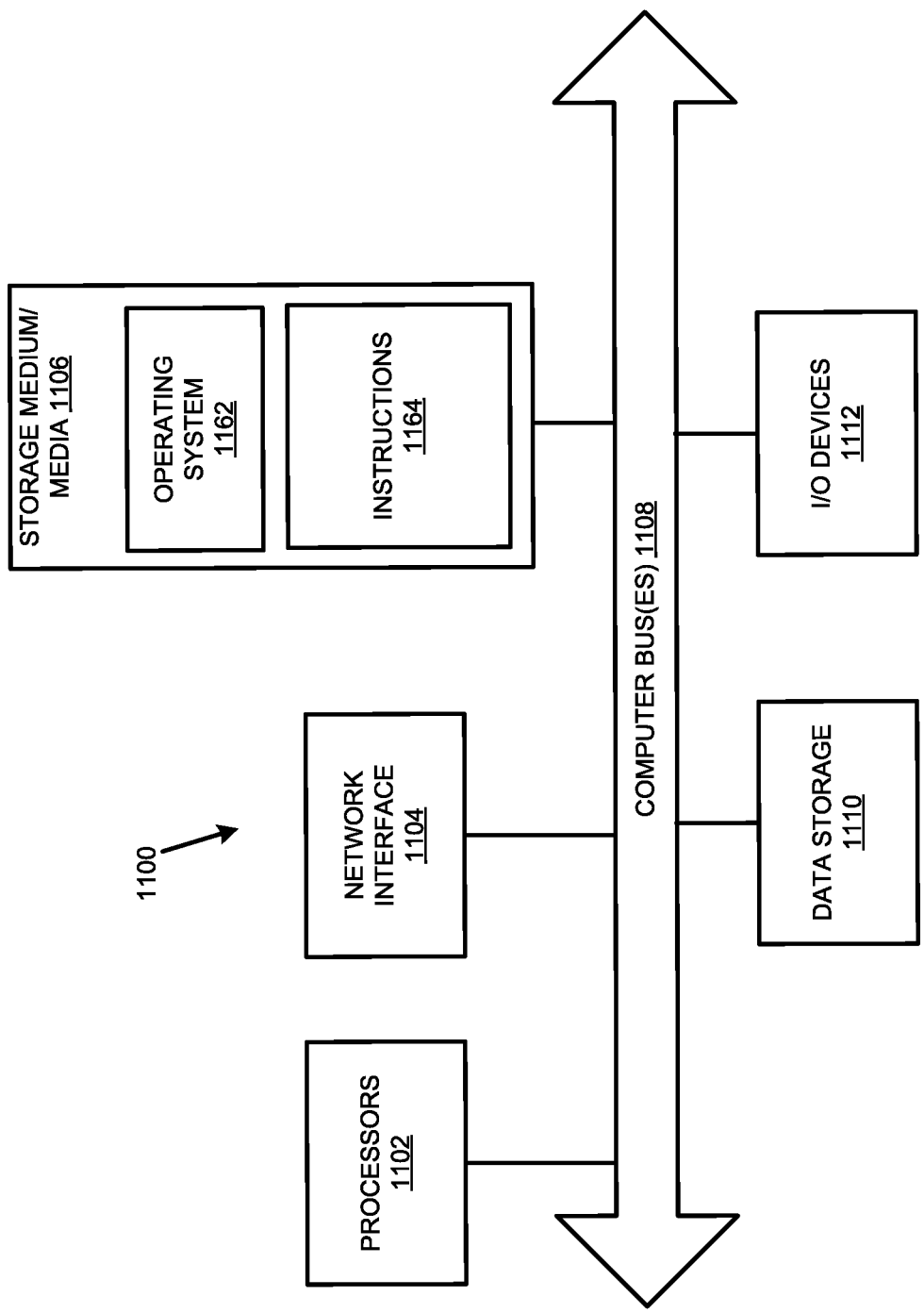
FIG. 11 illustrates a computer system that may be used to implement the data transformation system in accordance with examples disclosed herein.

FIG. 11 illustrates a computer system 1100 that may be used to implement the data transformation system 100. More particularly, computing machines such as desktops, laptops, smartphones, tablets and wearables which may be used to generate or access the data from the data transformation system 100 may have the structure of the computer system 1100. The computer system 1100 may include additional components not shown and that some of the components described may be removed and/or modified. In another example, a computer system 1100 can sit on external-cloud platforms such as, Amazon Web Services, AZURE cloud or internal corporate cloud computing clusters, or organizational computing resources, etc.

The computer system 1100 includes processor(s) 1102, such as a central processing unit, ASIC or other type of processing circuit, input/output devices 1112, such as a display, mouse keyboard, etc., a network interface 1104, such as a Local Area Network (LAN), a wireless 802.11x LAN, a 3G or 4G mobile WAN or a WiMax WAN, and a computer-readable medium 1106. Each of these components may be operatively coupled to a bus 1108. The computer-readable medium 1106 may be any suitable medium which participates in providing instructions to the processor(s) 1102 for execution. For example, the computer-readable medium 1106 may be non-transitory or non-volatile medium, such as a magnetic disk or solid-state non-volatile memory or volatile medium such as RAM. The instructions or modules stored on the computer-readable medium 1106 may include machine-readable instructions 1164 executed by the processor(s) 1102 to perform the methods and functions of the data transformation system 100.

The data transformation system 100 may be implemented as software stored on a non-transitory computer-readable medium and executed by the one or more processors 1102. For example, the computer-readable medium 1106 may store an operating system 1162, such as MAC OS, MS WINDOWS, UNIX, or LINUX, and code 1164 for the data transformation system 100. The operating system 1162 may be multi-user, multiprocessing, multitasking, multithreading, real-time and the like. For example, during runtime, the operating system 1162 is running and the code for the data transformation system 100 is executed by the processor(s) 1102.

The computer system 1100 may include a data storage 1110, which may include non-volatile data storage. The data storage 1110 stores any data used by the data transformation system 100. The data storage 1110 may be used to store the process document 110, the textual data extracted from the process document 110, the entities, entity attributes actions identified from the textual data, the flows generated and the like.

The network interface 1104 connects the computer system 1100 to internal systems for example, via a LAN. Also, the network interface 1104 may connect the computer system 1100 to the Internet. For example, the computer system 1100 may connect to web browsers and other external applications and systems via the network interface 1104.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. A machine learning (ML) based data transformation system comprising:
at least one processor;
a non-transitory processor readable medium storing machine-readable instructions that cause the at least one processor to:
identify one or more structural elements from a process document including textual data outlining one or more procedures of a process that is to be automated;
extract one or more common parameters from the process document wherein the common parameters include textual content and one or more of the structural elements;
cluster the textual data from the process document based on the common parameters extracted from the textual data;
segregate the clustered textual data into conditional statements and non-conditional statements;
obtain clause level intent of the clustered textual data segregated into the conditional statements and the non-conditional statements wherein the clause level intents include verbs in clauses of the conditional and the non-conditional statements;
identify one or more entities, attributes of the entities from the textual data based on comparisons of the textual data with domain knowledge;
generate one or more flows corresponding to the procedures wherein the flows provide logical sequences for actions associated with the entities and the attributes of the entities that are to be executed during automatic execution of the procedures and the flows encode rules defining conditions for the automatic execution of the procedures;
provide a display of the one or more flows on a graphical user interface (GUI), wherein the one or more flows correspond to the procedures included in the process document and the one or more flows include discrete entity elements associated with the one or more entities, the discrete entity elements are interconnected with discrete operator elements corresponding to the actions associated with the entities;
automatically execute the process; and
enable presentation of an output obtained from the automatic execution of the procedures.

2. The data transformation system of claim 1, wherein the machine-readable instructions for enabling the presentation of the output comprise further machine-readable instructions that cause the processor to:
receive additional documents related to the procedures; and
identify values pertaining to the entities and the attributes of the entities from the additional documents.

3. The data transformation system of claim 2, wherein the machine-readable instructions for enabling the presentation of the output comprise further machine-readable instructions that cause the processor to:
automatically execute the procedures based on the values identified from the additional documents.

4. The data transformation system of claim 1, wherein the machine-readable instructions for automatically executing the process comprise further machine-readable instructions that cause the processor to:
access platform-specific templates that include code elements that are to be mapped to the flows.

5. The data transformation system of claim 4, wherein the machine-readable instructions for enabling the presentation of the output comprise further machine-readable instructions that cause the processor to:
map the entities, entity attributes and the actions included in the flows to the code elements; and
generate code specific to the platform executing the procedures.

6. The data transformation system of claim 1, wherein the machine-readable instructions for generating the code further cause the processor to:
enable editing of the flows by a user via the GUI.

7. The data transformation system of claim 1, wherein the non-transitory processor readable medium stores further machine-readable instructions that cause the processor to:
receive user input in response to the presentation of the output, wherein if the user rejects the output,
compare the user input with input from senior users, and if the user input is different from the input from the senior users,
automatically transmit the user input to user's supervisor.

8. The data transformation system of claim 1, wherein the non-transitory processor readable medium stores further machine-readable instructions that cause the processor to:
determine if the process document is of a processor-readable format,
and if the process document is not of a processor-readable format,
convert the process document into a processor-readable format.

9. The data transformation system of claim 8, wherein the non-transitory processor readable medium stores further machine-readable instructions that cause the processor to:
parse and tokenize the document that is converted into the processor-readable format.

10. The data transformation system of claim 1, wherein the non-transitory processor readable medium to generate one or more flows based on the procedures stores further machine-readable instructions that cause the processor to:
derive intent for procedural statements in the textual data by employing multi-sentence interpretation; and
identify underlying sub-patterns from a series of sentences from the process document.

11. The data transformation system of claim 1, wherein the non-transitory processor readable medium to generate the one or more flows based on the procedures stores further machine-readable instructions that cause the processor to:
sort the entities, the attributes of the entities and the actions based on verbs included in the clauses.

12. The data transformation system of claim 1, wherein the GUI is a drag and drop user interface with an entity panel including at least the discrete entity elements and an operators panel including at least the discrete operator elements.

13. The data transformation system of claim 1, comprising further machine-readable instructions that cause the processor to:
determine multiple intents from the process document, the multiple intents are determined step-wise at various levels that include the clause level intent, a sentence level intent, a paragraph level intent, a page level intent and a document level intent.

14. The data transformation system of claim 13, the instructions to determine the multiple intents cause the processor to:
employ different classifiers trained for intent determination at a given level of the various levels wherein the different classifiers are arranged in a pipeline for determining the multiple intents.

15. A processor-executable method for identifying new entities comprising:

receiving a process document including textual data outlining one or more procedures of a process that is to be automated;

identifying, using classifiers, one or more structural elements from the process document wherein the structural elements includes formatting information of the textual data and data arrangements of the textual data;

extracting one or more common parameters from the textual data;

clustering the textual data from the process document based on the common parameters extracted from the textual data;

segregating the textual data into conditional statements and non-conditional statements;

obtaining, using one or more chunkers, clause level intent of the data segregated into the conditional statements and the non-conditional statements wherein the clause level intents include verbs in clauses of the conditional and the non-conditional statements;

identifying one or more entities, attributes of the entities and actions to be executed from the textual data based on fuzzy match of the textual data with domain knowledge;

generating one or more flows corresponding to the procedures wherein the one or more flows provide logical sequences for the actions to be executed during automatic execution of the procedures, the entities and the attributes of the entities that are transformed by the actions and the one or more flows encode rules defining conditions for the automatic execution of the procedures;

providing a display of the one or more flows on a user interface, wherein the one or more flows correspond to the procedures included in the process document and the one or more flows include discrete entity elements associated with the one or more entities, the discrete entity elements are interconnected with discrete operator elements corresponding to the actions associated with the entities; and automatically executing the procedures based on the one or more flows.

16. The method of claim 15, wherein extracting one or more common parameters further comprises:

extracting the common parameters which include elements from the textual data and one or more of the structural elements.

17. The method of claim 15 wherein segregating the textual data into conditional statements and non-conditional statements further comprises:

identifying the conditional statements that include conditions to be applied to one or more of the entities and the attributes of the entities for the automatic execution of the procedures based on the verbs in the clauses of the conditional statements.

18. The method of claim 15 further comprising:

normalizing the verbs in the conditional statements and the non-conditional statements.

19. The method of claim 15 wherein automatically executing the procedures further comprises:

accessing platform-specific templates that include code elements that are to be mapped to the flows;

mapping the entities, the entity attributes and operators included in the flows to the code elements; and generating code specific to the platform executing the procedures.

20. A non-transitory computer-readable storage medium comprising machine-readable instructions that cause a processor to:

identify one or more structural elements from a process document including textual data outlining one or more procedures of a process that is to be automated;

extract one or more common parameters from the process document wherein the common parameters include textual content and one or more of the structural elements;

cluster the textual data from the process document based on the common parameters extracted from the textual data;

segregate the clustered textual data into conditional statements and non-conditional statements;

obtain clause level intents of the clustered textual data segregated into the conditional statements and the non-conditional statements wherein the clause level intents include verbs in clauses of the conditional and non-conditional statements;

identify one or more entities and attributes of the entities from the textual data based on comparisons of the textual data with domain knowledge;

generate one or more flows corresponding to the procedures wherein the one or more flows provide logical sequences for actions between the entities and the attributes of the entities that are to be executed during the automatic execution of the procedures and the one or more flows encode rules defining conditions for the automatic execution of the procedures;

provide a display of the one or more flows on a graphical user interface, wherein the one or more flows correspond to the procedures included in the process document and the one or more flows include discrete entity elements associated with the one or more entities, the discrete entity elements are interconnected with discrete operator elements corresponding to the actions associated with the entities;

automatically execute the process; and enable presentation of an output obtained from the execution of the procedures.

\* \* \* \* \*